(12) United States Patent
Bush et al.

(10) Patent No.: US 9,323,245 B2
(45) Date of Patent: Apr. 26, 2016

(54) FLEXIBLE SECURITY CONTROL ENVIRONMENT

(71) Applicant: ROCKWELL AUTOMATION TECHNOLOGIES, INC., Mayfield Heights, OH (US)

(72) Inventors: Michael A. Bush, Hudson, OH (US); Robert A. Brandt, Menomonee Falls, WI (US); Ronald E. Bliss, Twinsburg, OH (US); Michael B. Miller, West Allis, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 689 days.

(21) Appl. No.: 13/667,914

(22) Filed: Nov. 2, 2012

(65) Prior Publication Data
US 2013/0125233 A1 May 16, 2013

Related U.S. Application Data

(60) Provisional application No. 61/558,985, filed on Nov. 11, 2011.

(51) Int. Cl.
| G06F 21/00 | (2013.01) |
| G05B 23/02 | (2006.01) |
| G06F 21/30 | (2013.01) |
| G09G 5/00 | (2006.01) |

(52) U.S. Cl.
CPC ............ *G05B 23/0216* (2013.01); *G06F 21/30* (2013.01); *G05B 2219/23121* (2013.01); *G05B 2219/23171* (2013.01); *G05B 2219/24093* (2013.01); *G09G 5/00* (2013.01); *G09G 2340/14* (2013.01)

(58) Field of Classification Search
None
See application file for complete search history.

(56) References Cited

U.S. PATENT DOCUMENTS

| 2007/0136603 A1* | 6/2007 | Kuecuekyan ....... G06F 21/6218 713/185 |
| 2008/0162930 A1* | 7/2008 | Finney et al. ................. 713/165 |
| 2009/0083843 A1* | 3/2009 | Wilkinson et al. ................. 726/9 |
| 2010/0042953 A1* | 2/2010 | Stewart ................. G06F 3/0482 715/854 |
| 2011/0283350 A1* | 11/2011 | Brandt et al. .................... 726/13 |

* cited by examiner

*Primary Examiner* — Christopher Revak
(74) *Attorney, Agent, or Firm* — Fletcher Yoder, P.C.

(57) ABSTRACT

An automation control system is provided with an interface device configured to enable a user to monitor, control, or monitor and control processes of the automation control system. Upon power on or initialization of the interface device or when a previously logged in user is logged off, the interface device logs in a guest account associated with a user role having a defined set of access rights and provides access to monitor, control, or monitor and control the processes based upon the set of access rights.

21 Claims, 10 Drawing Sheets

FLEXIBLE SECURITY CONTROL ENVIRONMENT

CROSS-REFERENCE TO RELATED APPLICATIONS

This application is a Non-Provisional Application of U.S. Provisional Patent Application No. 61/558,985, entitled "Visualization Software Platform and Terminal", filed Nov. 11, 2011, which is herein incorporated by reference in its entirety for all purposes.

BACKGROUND

Embodiments of the present disclosure relate generally to the field of automation control and monitoring systems. More particularly, embodiments of the present disclosure relate to flexible security implementations in the automation control and monitoring systems.

A wide range of applications exist for automation control and monitoring systems, particularly in industrial settings. Such applications may include the powering of a wide range of actuators, such as valves, electric motors, and so forth, and the collection of data via sensors. Typical automation control and monitoring systems may include one or more components, such as: programming terminals, automation controllers, input/output (I/O) modules, and/or human-machine interface (HMI) terminals.

The human machine interfaces or "HMIs" are commonly employed for monitoring or controlling various processes. The HMIs may read from or write to specific registers such that they can reflect the operating state of various machines, sensors, processes, and so forth. The interfaces can also write to registers and memories such that they can, to some extent, control the functions of the process. In monitoring functions alone, little or no actual control is executed. In many other settings, similar devices are employed, such as in automobiles, aircraft, commercial settings, and a host of other applications. In many applications, the interface may not communicate with a remote device or process, but may be operated in a stand-alone manner.

In these interface devices, the objects used in the interface may correlate to different controls, monitors, or any other parameter of an industrial automation device. Some of these objects may have visual representations on the interface devices, while other objects may not be visually represented but may be accessible for configuration and programming by a user. A user may desire to manipulate these objects, such as by creating new objects, copying objects, editing objects, etc., to create and customize an interface.

Each of the components in an automation control and monitoring system may make use of state information of one or more objects (e.g., control programs, tags, module configuration, and HMI screens) of the control and monitoring system. As may be appreciated, each industry and/or control environment may make use of customized processes and/or control environment implementations. For example, customers who implement the automation control and monitoring systems may vary drastically regarding security policies, etc. around access rights to one or more objects via the interface devices. Unfortunately, these customers are oftentimes limited by, or must work around, standard security implementations provided by the manufacturers of the interface devices.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In traditional automation control and monitoring systems, a user may be required to present user authentication upon power up and/or initialization of an interface device or when a previous user logs out of the interface device. Accordingly, even the most basic functions have required a user to input at least a PIN to access the interface device.

Present embodiments provide a novel approach to enable flexible security for interface devices of an automation control and monitoring system. A role-based security solution is provided that includes a guest user account. The guest user account may be automatically logged into the interface device as it is powered on or initializes or as a user logs out of the interface device. Accordingly, without any interaction from a user of the interface device, a guest user account may be logged in upon power up or initialization of the interface device or upon a user logging out of the interface device. A role may be associated with the guest user account to customize access rights for this user account. The role associated with the guest user account and the access rights associated with the role may determine the access allowed by the guest user. If additional access (e.g., to objects within the automation control and monitoring system) is needed, the user may login as a user with a different role (e.g., administrator, engineer, maintenance crew, operator, supervisor, etc.), which will enable access for the particular role or roles associated with the user. Further, a restricted access role may be associated with the guest user account. The restricted access role may be used to provide limited access rights to particular roles. For example, because the guest user account may be logged in without any authentication input (e.g., a password or personal identification number (PIN)), the restricted access role may be useful to provide limited access to the interface device. Accordingly, with the guest user account that is automatically logged in when the interface device is powered on, initialized, or when an alternate user logs out and a restricted user role that may provide customized user access rights for accounts that do not have an associated authentication input (e.g., password, PIN, RFID access code, biometric input, barcode, etc.), an administrator of the interface device may configure the interface device to provide access or restrict access of components of the interface device when the guest user account is logged in (e.g., when user accounts with associated authentication inputs are not logged in). While the current discussion focuses on an administrator role, an engineer role, a maintenance role, and operator role, a supervisor role, and a restricted role, other roles may be specified by the manufacturer of the interface device and/or users of interface device.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Traditionally, security for control and monitoring systems has not been very flexible. For example, customers of interface devices, such as human-machine interfaces (HMIs), have traditionally had limited options regarding how users may make use of the interface devices. Because a wide variety of industry and/or control environment security policies exist, these inflexible security implementations do not provide options for every HMI customer. In accordance with present embodiments, through use of a guest account in the HMI, the security configurations of HMI devices may be highly customizable. For example, a guest user may be used in coordination with special role-based accounts to create versatile HMI security experiences that are easily customizable, based upon an industry or control environment policy. For example, access levels for initial power up and/or initialization of the interface device and/or access levels used when a user logs out of the interface device may be highly customizable. For example, when the access rights associated with guest user are full access (e.g., read and write access), security may be effectively disabled on the interface device. When the access rights associated with the guest user are no-access rights, ever user would be required to login using an alternate account. Further, any combination of user access rights may be attributed to the guest user. For example, the user may have access to view certain objects, read and write to other objects, and/or have no access to another set of objects. If the user requires access rights outside of this subset of rights attributed to the guest user, the user would need to login with another account that includes the proper access rights.

In accordance with present embodiments, by utilizing the flexible security solutions described herein, customers may customize the HMI experience for their own particular security policies. For example, by providing the presently disclosed flexible security solutions, present embodiments enable the customer to dictate initial access offerings before a user's credentials are verified, enabling a more robust security solution for a variety of automation control and monitoring environments. Further, through security inheritance, provided in accordance with present embodiments, customers of the automation control and monitoring system may experience easier customization of screens and/or objects accessed by the HMIs.

Figure 1:
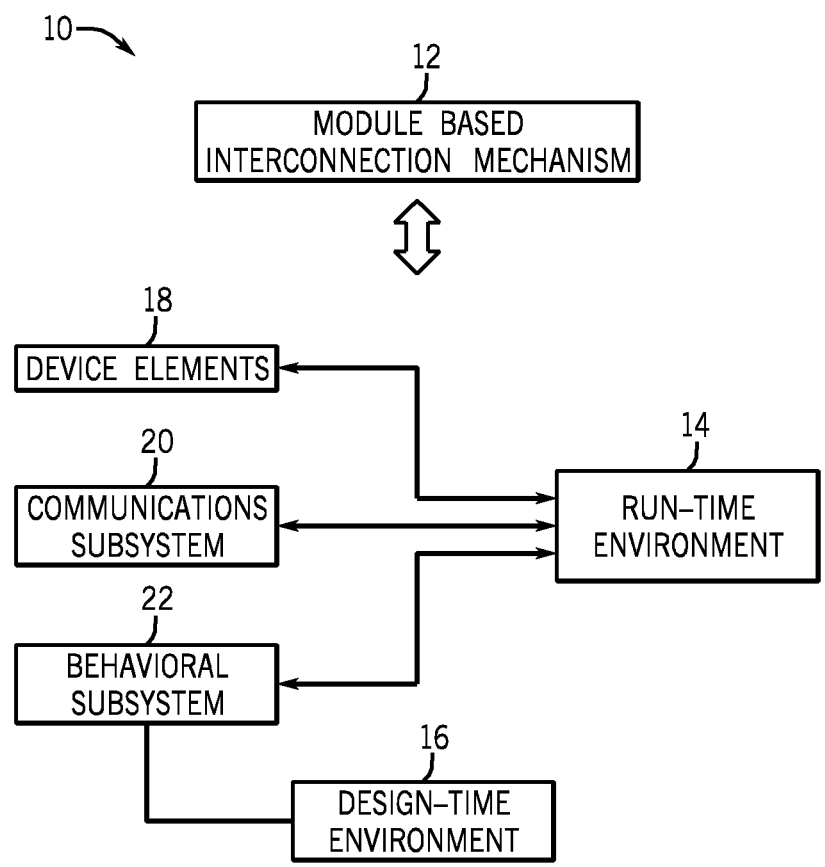
FIG. 1 is a general overview of a framework for portions of an automation control and monitoring system in accordance with an embodiment of the present invention.

A number of facets, components and processes will be described through the following discussion. By way of introduction, a general system overview is in order that situates these innovations in context. FIG. 1 is a diagrammatical representation of a control and monitoring software framework 10 for an interface in accordance with an embodiment of the present disclosure. The framework 10 facilitates building functional software by utilizing a module based interconnection mechanism 12, which inherently supports dynamic manipulation and configuration. This dynamic manipulation and configuration ability facilitates efficient provision of feature-rich configuration environments for configurable interfaces. That is, as described below, individual device elements are provided as stand-alone code that can be individually programmed, pre-written for use, as in a library, customized in their function and appearance in screens, and interconnected to provide information to a user as well as control and monitoring functions.

The framework 10 includes two interrelated software environments that can reside on a single system (e.g., computer). Specifically, a run-time environment 14 enables an operator (e.g., a human user) to interact with an application, such as a process during run-time (e.g., during use of the interface, typically during interaction with or observance of a process in operation). A design-time environment 16 permits a designer to configure the interface and its components. For example, a system may graphically present run-time information to an operator via the run-time environment 14 on a display (e.g., computer or interface device screen). Further, the system may include means (e.g., a keypad) for accepting operator input that can be detected and managed via the run-time environment 14. The environments interact as described in detail below, in innovative ways to provide greatly enhanced programming and use of the interface.

The run-time environment 14 includes or provides access to device elements 18. The device elements 18 are software components that may include any accessible or configurable element in a software environment. For example, the device elements 18 include software components, such as "ActiveX" controls or ".NET" components that are managed by the run-time environment 14. "ActiveX" and ".NET" refer to object-oriented concepts, technologies and tools. Those skilled in the art will be well-acquainted with such programming approaches generally. In the present context, such standards should be taken as merely examples, and "device elements" should be understood as including any generally similar components or self-sufficient programs that can be run as quasi-independent elements, sometimes referred to as "objects". Other standards and platforms exist for such elements, typically championed by different companies or industry groups.

The device elements described herein may be read, edited, and/or accessed based upon the flexible security solutions described herein. Because such device elements are basic to certain of the concepts set forth herein, a few words of introduction are in order. Device elements generally include four features: properties, methods, connections (or connection points) and communications interfaces. Properties, in this context, are attributes that can be adjusted, such as to define an image or representation of the element in a screen view, as well as its location on the screen, and so forth. In this context, a method is an executable function (sometimes referred to herein as the elements "functionality" or "state engine"), and defines an operation performed by execution of the element. A connection, in this context, is a link between elements, and can be used to cause data (read from a memory or written to a memory) to be sent to another element.

Specific examples of device elements 18 may include software pushbuttons, timers, gauges, PLC communication servers, visualizations (such as screens that illustrate state of components within the automation control and monitoring system), and applications. In general, virtually any identifiable function may be configured as such an element. Moreover, as discussed below, such elements may communicate with one another to perform a wide range of display, monitoring operations and control functions. It should be noted that device elements 18 do not require special limitations for supporting a design mode. Also, while elements associated with an image are quite useful, particularly for visualizations, many elements may not have a visual representation, but may perform functions within an HMI, such as calculations, or even management and data exchange between other elements.

The run-time environment 14 typically operates using a communications subsystem 20. The communications subsystem 20 is adapted to interconnect the device elements 18. In practice, the communications subsystem 20 may be thought of as including the connections of the device elements 18. However, it may include a range of software, hardware and firmware that send data to and receive data from external circuits, such as automation controllers, other computers, networks, satellites, sensors, actuators, and so forth.

The run-time environment 14 typically operates using a behavioral subsystem 22, which is adapted to manage the behavior of the device elements 18. For example, responsibilities of the behavioral subsystem 22 may include the following: place and move device elements, modify device elements, group device elements on interchangeable screens, save and restore screen layouts, manage security, save and restore connection lists, and supply remote access to the run-time environment 14. Here again, in practice, such behaviors may be defined as part of the profile (i.e., the "method" or "state engine") of each device element.

The design-time environment 16 includes an advanced implementation of the behavioral subsystem 22 that facilitates direct or indirect manipulation of the run-time environment 14, without impeding or compromising the behavior of the run-time environment 16. That is, design and reconfiguration of the device elements 18 can be done even while an interface is operating. In some instances, the behavioral subsystem 22 may extend access to the run-time environment 14 via remote provision of the design-time environment 16, such as in a conventional browser. The behavioral subsystem 22 allows a designer, depending on security access rights, to interact with and change aspects of the run-time environment 14 of an HMI via a remote programming terminal by serving the design-time environment 16 or aspects thereof to the programming terminal from the HMI. For example, an HMI coupled to a laptop via a network may provide a user with configuration capabilities by serving up a specific design-time environment 16 to the laptop via the network.

Details and examples of how this may be done are provided below. In current embodiments, the design-time environment 16 may be a product of combining Dynamic Hypertext Markup Language (DHTML) and an Active Server Page (ASP) server scripting to serve dynamic content to a browser. An ASP script is specially written code that includes one or more scripts (i.e., small embedded programs) that are processed on a server (e.g., Web server) before the page is sent to a user. Typically, in conventional usage, such script prompts a server to access data from a database and to make a change in the database. Next, the script typically builds or customizes the page before sending it to the requestor. As discussed below, such scripting is used in the present framework quite differently, such as to build visualizations without prior knowledge of either the functionality of device elements, or their interrelationships.

By facilitating changes to device elements, the design-time environment 16 allows the designer to make interchangeable design-time models or specialized implementations of the behavioral subsystem 22. A specific example of a design-time implementation of the behavioral subsystem 22 includes a Web-based design-time environment 16, which extends access to a run-time environment 14 on an HMI via a TCP/IP connection between the HMI and a remote device. The Web-based design-time environment 16 facilitates management of the device elements without compromising run-time performance or security. For example, the Web-based design-time environment 16 may access the user accounts, associated roles, and access rights, such that the Web-based design-time environment 16 may accurately determine and implement a user's access rights within the system. In one specialized implementation the behavioral subsystem 22 gives designers with write access the ability to manipulate aspects of the run-time environment 14 using a Web browser that is capable of accessing a related interface or HMI. As noted above, and as described in detail below this is achieved by using a combination of dynamic content, scripting, and configuration of the device element properties.

Figure 2:
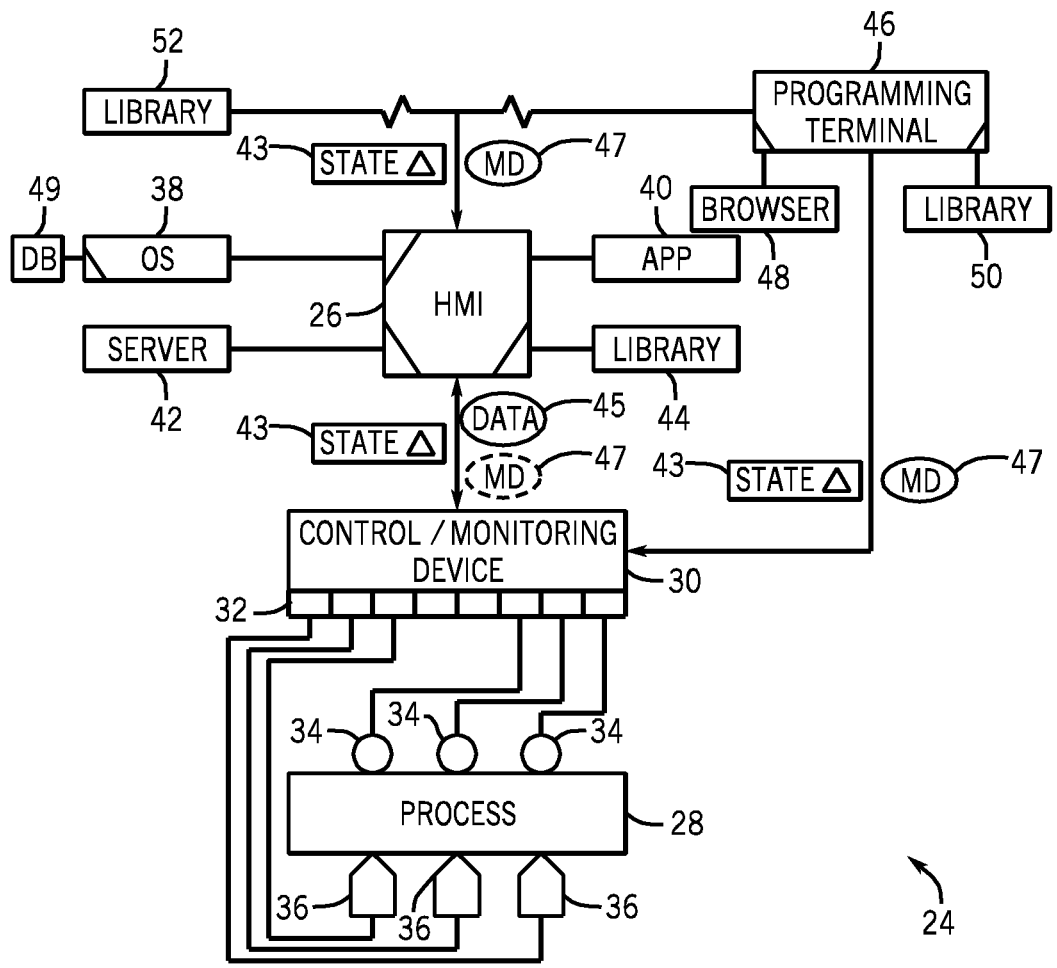
FIG. 2 is a diagrammatical overview of an automation control and monitoring system in accordance with an embodiment of the present invention.

FIG. 2 is a diagrammatical representation of a control and monitoring system 24, such as for industrial automation, implementing the framework described above in accordance with an embodiment of the present disclosure. The system 24 includes an HMI 26 adapted to interface with networked components and configuration equipment. In the illustrated embodiment, the HMI 26 is adapted to collaborate with components of a process 28 through a control/monitoring device 30 (e.g., a remote computer, automation controller, such as a programmable logic controller (PLC), or other controller). The HMI 26 may physically resemble existing hardware, such as a panel, monitor or stand-alone device.

Collaboration between the HMI 26 and components of the process 28 may be facilitated by the use of any suitable network strategies. Indeed, an industry standard network may be employed, such as DeviceNet, to enable data transfer. Such networks permit the exchange of data in accordance with a predefined protocol, and may provide power for operation of networked elements. As noted above, while reference is made in the present discussion to networked systems and to systems incorporating controllers and other equipment, the HMI 26, programming techniques, and security features described may be equally well applied to non-networked components (e.g., GPS displays, game displays, cell phone displays, tablet displays, etc.) and to networked systems outside the industrial automation field. For example, the arrangements, processes, and security features described below may be used in facilities management, automotive and vehicular interfaces, computer numeric control (CNC) machines, point of sale (POS) systems, control interfaces for commercial markets (e.g., elevators, entry systems), and so forth, to mention only a few.

The run-time or operation environment 14 constructed and managed by a corresponding behavioral subsystem, is stored on and resident in the HMI 26. For example, such a behavioral subsystem can be adapted to load the application configuration framework (e.g., 10) from a storage location, such as during initial manufacture or setup of the HMI 26. When loaded, the stored application framework may be adapted to create screens and locate user interface device elements (actual images or pictorial representations corresponding to the elements) in the screens. These applications, screens, and user interface elements are each types of device elements. As described below, the HMI 26 includes a stored application that dictates the layout and interaction of the device elements. The Web-based design-time environment 16, which is based on a run-time engine, is also loaded and resident on the HMI 26. The design-time environment 16 may be adapted to handle advanced features (e.g., security management) for both design-time and run-time environments.

The HMI 26 may be adapted to allow a user to interact with virtually any process. For example, the process may comprise a compressor station, an oil refinery, a batch operation for making food items, a mechanized assembly line, and so forth. Accordingly, the process 28 may comprise a variety of operational components, such as electric motors, valves, actuators, sensors, or a myriad of manufacturing, processing, material handling and other applications. Further, the process 28 may comprise control and monitoring equipment for regulating process variables through automation and/or observation. The illustrated process 28 comprises sensors 34 and actuators 36. The sensors 34 may comprise any number of devices adapted to provide information regarding process conditions. The actuators 36 may similarly include any number of devices adapted to perform a mechanical action in response to an input signal.

As illustrated, these sensors 34 and actuators 36 are in communication with the control/monitoring device 30 (e.g., an automation controller) and may be assigned a particular address in the control/monitoring device 30 that is accessible by the HMI 26. The sensors 34 and actuators 36 may be in direct communication with the HMI 26. These devices may be utilized to operate process equipment. Indeed, they may be utilized within process loops that are monitored and controlled by the control/monitoring device 30 and/or the HMI 26. Such a process loop may be activated based on process inputs (e.g., input from a sensor 34) or direct inputs (e.g., operator input received through the HMI 26).

The server software on the interface permits viewing of the development environment, and direct reconfiguration of the interface (particularly of the device elements and their associated appearance and functionality) without the need for special viewing or configuration software. This benefit flows from the fact that the device elements and the design-time environment itself is resident in the HMI 26, and "served up" by the HMI 26 to a browser or other general purpose viewer on a programming terminal 46. In other words, necessary support for external computer workstations (e.g., laptop and desktop computers) may be reduced or eliminated. It should be noted that reference to a "browser" for viewing and modifying configuration of the interfaces is not limited to Web browsers or to any particular browser. References to a browser are intended to be exemplary. More generally, the term "browser" is utilized herein to reference software which includes any general purpose viewer.

The HMI 26, through the programming of the device elements as described below, may be thought of as including instructions for presenting one or more screen views or visualizations, and device elements executed upon interaction with the HMI 26 by reference to the screen views (e.g., pressing a button, touching a location of a screen, and the like). The screen views and device elements may be defined by any desired software or software package. For example, the screen views and device elements may be called by or executed by an operating system 38. The device elements, as discussed above, in accordance with present embodiments, may be objects conforming to ".NET" or "ActiveX" standards. The operating system itself may be based upon any suitable platform, such as Window CE, OS-X, etc. As referenced herein, the device elements and tools support Web services or technology for transmitting data over networks (e.g., the Internet). These device elements thus follow a set of rules regarding information sharing and are adapted for use with various scripting and programming languages, as described below. Such device elements enable provision of interactive content to outside applications such as a LAN, WAN, an intranet, an extranet, or even the World Wide Web. Accordingly, the operating system 38 and the various device elements facilitate dynamic configuration of the HMI 26 through a browser 48 by allowing configuration access (e.g., serving up) to the browser 48.

For example, such configuration access includes access for instantiation of device elements. In other words, new device elements can actually be created and implemented from the browser 48. Again, it should be noted that the browser 48 does not require actual functional access. Indeed, in one embodiment, requests via the browser 48 result in a "draw" sequence of operations based on data functionality and content of device elements in a container, thus allowing illustration of the device element representations and access to their configuration without actually serving up functional aspects. This allows for configuration via a remote workstation without necessitating technical support for the remote workstation.

In addition to the operating system 38 and device elements as described above (and as described in greater detail below), the HMI 26 includes an application or application layer 40. The application 40, which may itself comprise a device element, facilitates access to and acquisition of information from the various device elements of the HMI 26. In particular, the application 40 represents a first level in a multi-level device element that can be enumerated for execution. The application 40 in a practical implementation may comprise a user application in the form of an XML page. The user application is then interacted with by the user or operator, as well as by the designer as described in greater detail below.

To facilitate interaction with the application 40, screen views and/or device elements may be presented to the user. The screen views and device elements may be described as independent executable pieces of software. In a present implementation, the screen views are defined by appropriate code written in a markup language (e.g., Hypertext Markup Language or HTML). Thus, the configuration of graphical interface screens for the HMI 26 may be performed without the use of conversion programs. Further, by programming of the device elements, the screen views may be developed directly on the HMI 26 via resident server software (designated as server 42) that makes the resident development environment available for remote access. Specifically, in one embodiment, representations of certain device elements (e.g., ActiveX controls) are served up to the browser 48 without serving up the software components themselves. Because a development or design-time environment may be accessed via a browser 48, the need to download changes to the screens and to update remote configuration software applications can be eliminated.

As noted above, device elements may include functionality by which they read from or write to specific memory or registers of memory, typically in other devices (but which could also be within the HMI). For example, a particular function may correspond to writing to or reading from a register 32 of control/monitoring device 30. In a simple case, for example, an object accesses a piece of data (e.g., a state of a component as determined by a sensor), and generates an output signal to write a value corresponding to the state of a different networked device. As will be discussed in more detail below, such state information may be communicated via state deltas 43. For example, in the embodiment depicted in FIG. 2, when a user has proper access to write changes to the application 40, the control/monitoring device 30 and HMI 26 may communicate state information representing those changes using state deltas 43. Further, a programming terminal 46 may communicate state information with the HMI 26 and control/monitoring device 30 using the state deltas 43, as well. Before any changes are propagated, access rights of a user making the change may be authenticated, thus reducing unauthorized modifications to the application 40.

Much more complex functionality can, of course, be configured. In an industrial control and monitoring context, for example, such device elements may emulate operation of a range of physical components, such as a momentary contact push button, a push button with delayed output, a switch, and so forth. Many pre-programmed device elements may be available for use by the HMI 26. Such functional modules may be accessible via a network, or may be resident on the HMI 26, or resident on a separate device directly linked to the HMI 26. In this way, an HMI supplier or software supplier may provide many possible building blocks from which screens and complex control and monitoring functions may be programmed. Indeed, a library 44 of available device elements may reside on the HMI 26. When a user has proper rights to access and use the library 44, the library 44 may facilitate configuration of the HMI 26, as described below. The screen instructions may call upon the device elements for performing desired functions based upon operator inputs, and these instructions may be programmed into versions of the pre-programmed elements. For example, the operator may provide initiating inputs by touching a location on a touch screen or depressing keys on a keyboard. Based upon the screen instructions and the device elements associated with the instructions (e.g., with specific locations triggering calls or execution of pre-configured device elements) the desired functions may then be executed. Accordingly, when the operator has sufficient access, the operator is enabled to interact with a process, typically to change screen views, write to registers, or command the generation of other output or control signals. In a stand-alone implementation, the interactions may simply recall or store data, change screens, and so forth.

One or more separate interface screens may be employed, with some HMIs having many such screens and a great number of device elements. Each device element may, in turn, be uniquely programmed to consider specific inputs, perform specific functions, and generate signals for specific outputs. A plurality of such device elements can be loaded and hosted in a single software "container" (e.g., ActiveX container) as described below. Also, as described herein, each of the interface screens may be uniquely programmed to only be accessible to certain users and/or roles based upon access rights associated with the user and/or roles. These access rights may be inherited from other, higher-level, interface screens or folders containing the interface screens.

The HMI 26 may be configured by interacting directly with a panel or screen on the HMI 26 itself (if one is present), but in many cases configuration will be performed from the remote programming terminal 46. For example, access is provided directly to the resident library 44 and/or operating system 38 and application 40 via the browser 48 or similar application. In a present implementation, no other specialized software is required at the programming terminal 46. Indeed, the server 42 resident on the HMI 26 may provide access to the device elements in the library 44. By storing the device elements in the library 44 directly on the HMI 26, the risk of version conflicts and so forth are eliminated or reduced. Additionally, the HMI 26 may be directly connected to the programming terminal 46, or accessed by reference to an IP address (Internet Protocol address) assigned to the HMI 26.

Access control schemes may be used to limit the ability to change, view, or manage screens and device elements, in accordance with present embodiments. For example, a password or user access status may be required to gain such access. As will be discussed in more detail below, a user may be required to login to activate an account assigned pre-defined user roles, wherein the user role devices access boundaries. Such roles are assigned, for example, based upon a user's job roles. These user roles may be associated with access rights, such as no access, read only access, and/or full access for a particular screen, folder of screens, project, etc. Further, in some embodiments, these access rights may be inherited in a hierarchical manner. For example, a screen contained in a folder may inherit access rights for some or all of the user roles from the containing folder.

In some embodiments, a default account (e.g., a "guest account") may be logged into the interface device (e.g., HMI 26) upon power-up and/or initialization of the HMI 26 or upon log out of another user of the HMI 26. In other words, a default account is treated like a user login and can be assigned particular roles. The default user/account may be associated with any of the pre-defined roles in the system. Accordingly, because any of the pre-defined roles may be associated with the default account, any set of user access rights associated with the various roles (e.g., read only access, full access, inherited access, and/or no access) may be associated with the default user.

Once the device elements then resident on the HMI 26 are accessible to the programming terminal 46, aspects of the HMI 26 can be modified or updated directly on the HMI 26 via the communication link from the programming terminal 46. However, access to modify these aspects may depend on access rights of the currently logged in account and associated user role. For example, a user may wish to update a particular HMI graphic to provide data, such as historical data or trending relating to information being received from a newly installed sensor 34. Additionally, the user may find it desirable or convenient to update the HMI graphic for presentation of such data while in an off-line mode (e.g., without immediately implementing the changes). In such a scenario, the user may link to the library 44 of available device elements via the programming terminal 46 and use them to modify the HMI graphic or functionality in a development environment, but only if the user has write access (e.g., full access) to the objects and data stored in the current HMI screen.

It should be noted that additional device elements can be added to the library 44. For example, if a trending device element is not resident on the HMI 26, a user can download such an element to the HMI 26 from a configuration library 50 resident on the programming terminal 46. Alternatively, a user could access the trending device element from a resource library 52 accessible via a network (e.g., the Internet), either directly to HMI 26 or through the programming terminal 46. This may be particularly beneficial because new and improved device elements can be downloaded to the HMI 26 individually and on a periodic basis, thus adding new functionality without necessitating the periodic release of new conversion programs or HMI operating systems, or run-time or design-time environment software. The development environment may provide links to such libraries. Further, in embodiments using embedded code (e.g., operating system, server software, device objects, etc.), because the embedded code resides on the HMI 26, version conflicts with the embedded code may be avoided and the necessity for programming terminal software upgrades may be eliminated.

Figure 3:
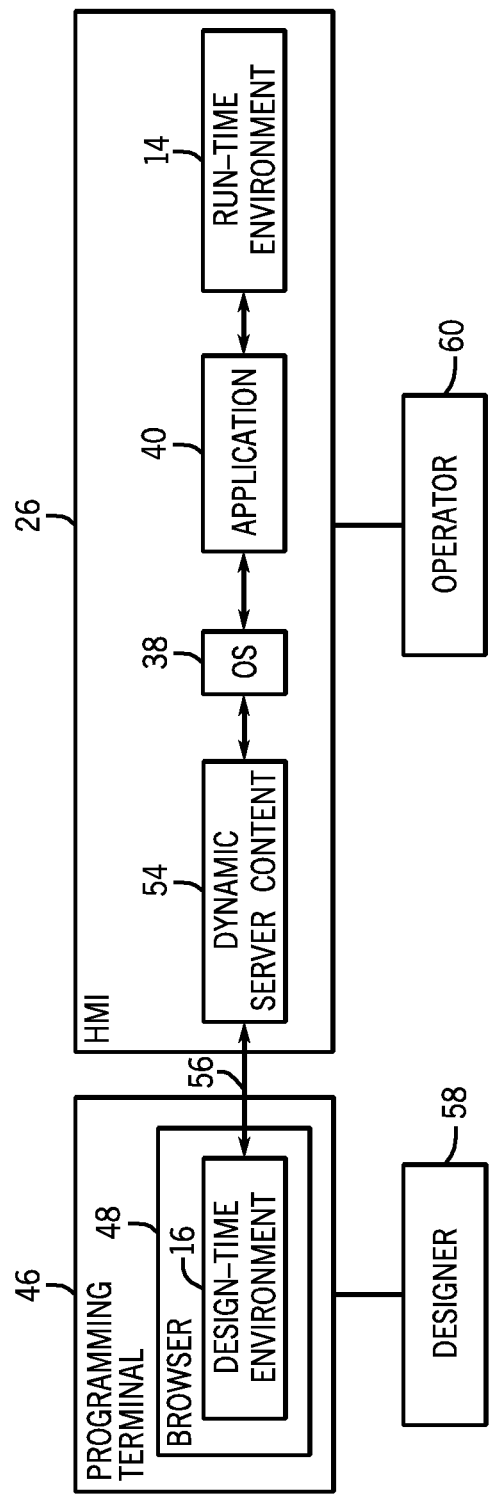
FIG. 3 is an overview of certain of the functional components in an interface and a programming terminal in accordance with an embodiment of the present invention.

To better illustrate the relationship between the design-time and run-time environments, FIG. 3 provides a high-level flow diagram representing interaction between an HMI 26 and a programming terminal 46. More detail regarding such processes is provided below. In general, a platform for the HMI 26 and programming terminal 46 will include the operating system or executive software 38, application software 40, as well as any communication software, a microprocessor, a network interface, input/output hardware, generic software libraries, database management, user interface software, and the like (not specifically represented in FIG. 3). In the illustrated embodiment, a design-time platform and a run-time platform interact within the HMI 26. The design-time platform provides views that are served as the design-time environment 16 to a desktop personal computer platform (e.g., running a suitable operating system 38, such as Windows XP, Windows Vista, or Linux) and the run-time platform cooperates with the design-time platform via the operating system (e.g., Windows CE, Linux). The design-time platform provides dynamic server content 54, while the run-time platform displays views on the HMI 26 itself (if a display screen is provided on the HMI 26). The design-time environment 16 is displayed in a browser 48 (e.g., Web browser or other general purpose viewer).

FIG. 3 represents at a very high level how the design-time environment 16 interacts with the operating system 38, application 40 and run-time environment 14. The arrow 56 represents dynamic exchange of content between the HMI 26 and programming terminal 46. In general, interaction with the design-time environment 16 is the task of a designer 58 who initially configures the HMI screens or visualizations, device elements, their functions and interactions, or who reconfigures such software. Such configurations by the designer may be facilitated through the access rights described herein. For example, the designer 58 may only be able to configure the HMI screens or visualizations if the designer 58 is logged in under an account with associated write access rights. When proper rights are associated with a user account, the run-time environment 14 is generally interacted with by an operator 60 directly at the HMI 26. It should be noted that while the design-time environment 16 has particular hardware and/or software dependencies, in a current embodiment, it depends heavily on the operating system 38, application 40 and run-time environment 14. The design-time environment 16 and the run-time environment 14 may utilize certain base technologies (e.g., DHTML, HTML, HTTP, dynamic server content, JavaScript, Web browser) to operate respectively in the design-time platform and run-time platform. While, in the illustrated embodiment, the run-time environment 14 and the design-time environment 16 reside on separate platforms, in some embodiments they may reside on the same platform. For example, the design-time platform and run-time platform may be configured as or considered a single platform.

In one embodiment of the present disclosure, a design-time Web implementation is utilized. This design-time Web implementation offers the speed and flexibility of software running on the design-time platform by using the Web browser (e.g., 48) with DHTML support from the HMI, as noted by the dynamic server content 54 in FIG. 3. DHTML is used to perform dynamic manipulation of Web content in the design-time environment 16. Further, the dynamic server content 54 is used in the HMI to serve dynamic Web content to the design-time environment 16. This dynamic client-server environment allows the Web browser to simulate an application running on the design-time platform without requiring a piece of software compiled for a related processor.

Figure 4:
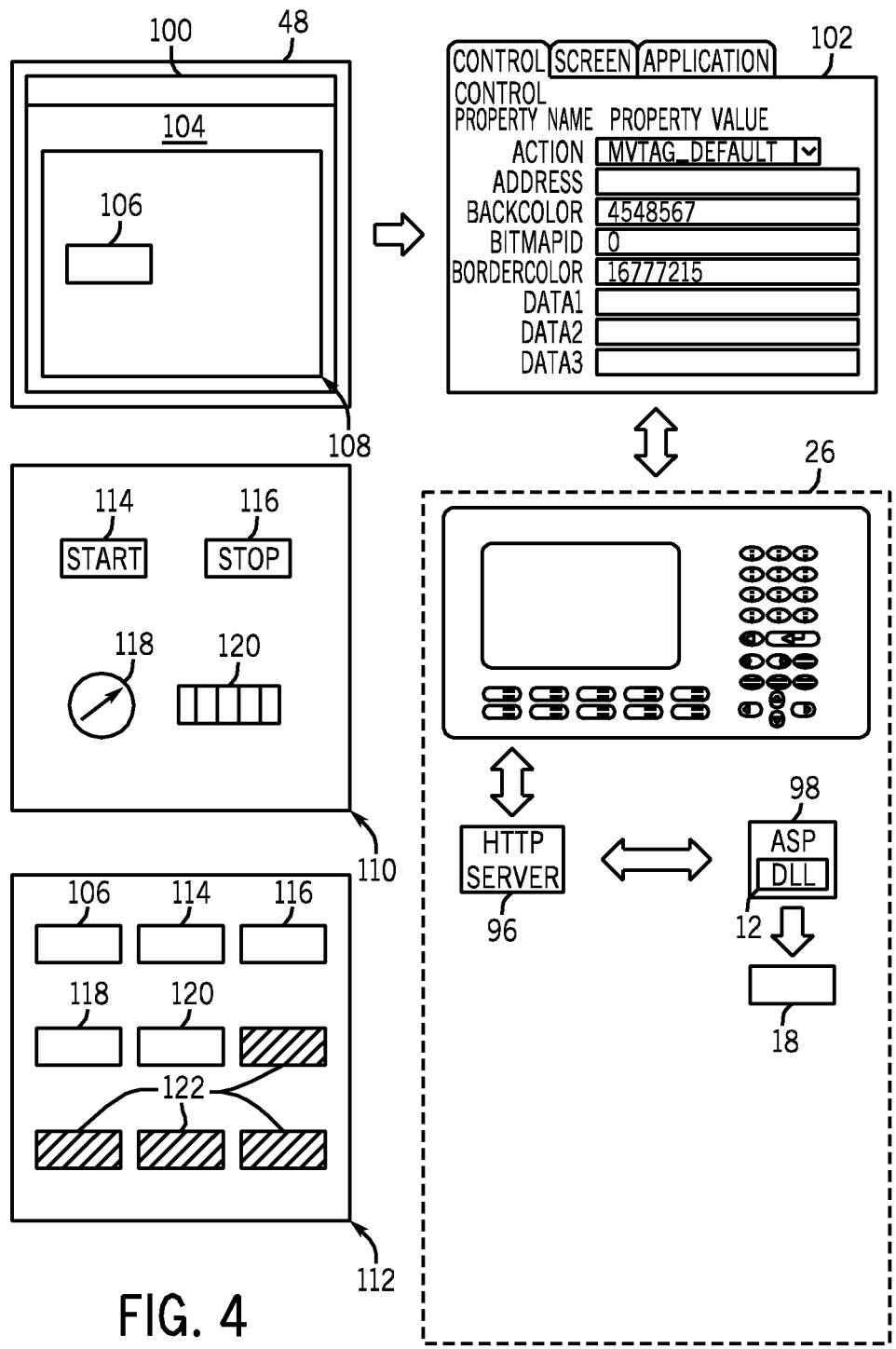
FIG. 4 is an overview of certain views or containers of device elements in accordance with an embodiment of the present invention.

FIG. 4 is a diagram illustrating one or more device elements in a design-time environment in accordance with embodiments of the present techniques. The diagram includes interactions illustrated by relationships between a display 100 (e.g., a screen for browser display), a property editor 102, and the HMI 26.

The design-time environment represented by the configuration screen or display 100 includes static content 104 and dynamic content. The dynamic content includes images corresponding to any displayed or represented device elements 106 (e.g., virtual on/off button, gauge). In one embodiment of the present techniques, the image is specified by an image tag in HTML and is part of a JPEG file created by the HMI as described below. The static content 104 may be created by an active server page (ASP) server or it may preexist in an HTML file. As discussed above, it should be noted that, in some embodiments, only designated designers can edit the static content 104. For example, to edit static content 104 or dynamic content, the designer's account would need to be associated with proper edit rights (e.g., write access) for the static content 104 or the dynamic content. In some cases, all designers may be granted edit rights by associating write access to a designer role associated with all of the designers' accounts.

The design-time environment represented by the configuration screen or display 100 includes static content 104 and dynamic content. The dynamic content includes images corresponding to any displayed or represented device elements 106 (e.g., virtual on/off button, gauge). In one embodiment of the present techniques, the image is specified by an image tag in HTML and is part of a JPEG file created by the HMI as described below. The static content 104 may be created by the ASP server or it may preexist in an HTML file. It should be noted that, in some embodiments, designated designers only can edit the static content 104.

In the representation of FIG. 4, the device element representation 106 is contained within a view container 108. As will be appreciated by those skilled in the art, a container generally defines a portion of a processing space in which certain device elements are opened and ready for use. The container 108 may thus correspond to a first view container that includes only the elements viewable within the current screen. As discussed above, many such screens may be provided in the HMI. Other screens, such as alternative control or interface screens may be provided in other view containers, such as a container 110. In general, to speed the operation (e.g., changing between screen views) of the HMI, such view containers are predefined and associated with one another by definition of the individual device elements with which they are either associated or within which representations of the device elements are provided. A global container 112 may be defined to include all of the device elements necessary for the various view containers, as well as other elements that may not be represented in any view container.

As illustrated in FIG. 4, view container 108 includes the virtual button 106 which performs a "jog" function and is manifested by a representation in a first screen. New container 110 includes several components, such as a "start" button 114, a "stop" button 116, a virtual gage 118 and a digital readout 120. The global container 112, then, will include all of these device elements for the various view containers, as well as any device elements 122 that are required for operation of the viewable device elements but that are not themselves viewable. Such device elements may include elements that perform computations, trending, communications, and a wide range of other functions.

As discussed above, these containers may be used to define a hierarchy useful for inheritance of access rights. For example, each of these contains may have associated access rights based upon user roles and/or user accounts. Access to the containers (and the content inside those containers) may be limited based upon the access rights associated with the user roles and/or user accounts. For example, in some embodiments, the global container 112 may contain the view container 108. Because the global container 112 contains the view container 108, access rights for the view container 108 may be inherited from the global container 112. Further, objects within the view container 108 (e.g., the virtual button 106) may inherit access rights from the view container 108 and/or a screen contained in the view container 108. When a user does not have proper access rights (e.g., read access), the user may not access the container 108 or the elements within the container 108. Accordingly, any navigation elements leading to these elements may be disabled or hidden from the user.

FIG. 4 also illustrates the property editor 102 in which a user may access various properties of the element 106. As discussed above, the element 106 may also include connections and text associated with the element 106, which may also be configured by the user via an editor, similar to the property editor 102. Access to the property editor 102 may depend on the role and access rights of the user logged in to the system. For example, when no access is associated with the logged in user's role, the property editor 102 may not be visible or may be visible but not populated with data. When read only access is associated with the user's role, the data in the property editor 102 may be populated but may not be editable (e.g., as indicated by being grayed out). When the user's role is associated with write access (e.g., full access) the property editor 102 may be populated with data and the data may be editable.

In an embodiment, the property editor 102 may interact with the HMI 26 via a query string from the browser (e.g., browser 48 of FIG. 2) to a server 96 (e.g., HTTP server) that is resident on the HMI 26. The server 96 cooperates with an ASP server 98 including the module based interconnection mechanism 12, such as a dynamic-link library (DLL) 99 to receive and respond to queries. The DLL 99 allows for storage of executable routines as separate files, which can be loaded when needed or referenced by a program. In the example set forth above, upon receiving the call, the page is reloaded by the ASP server 98 and the query string is initially parsed resulting in evaluation of the move command. Server side scripts then access the device element 18 represented by the image 106 and update its location property. The new property information is then updated on the page and the page is passed to the browser 48.

Figure 5:
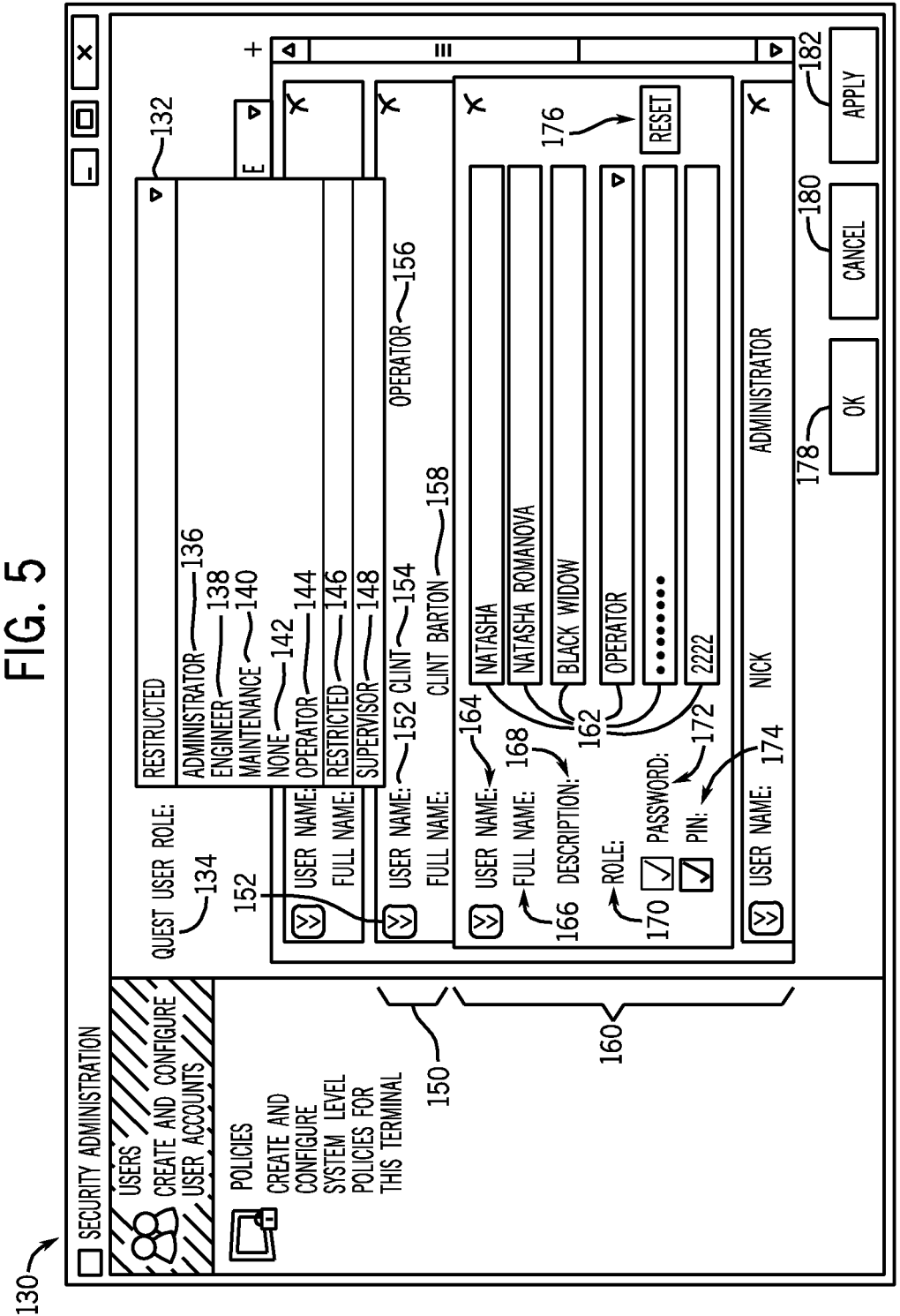
FIG. 5 is a schematic view of a security programming screen of the control and monitoring system of FIG. 2, in accordance with an embodiment of the present invention.

FIG. 5 is a representation of a security programming screen or visualization 130 of the control and monitoring system 24 of FIG. 2. The visualization 130 includes programming features for the default user (e.g., "guest account"). The security programming screen 130 may be useful for assigning security policies (e.g., user roles) for users of the control and monitoring system 24. For example, as discussed above, the default user (e.g., "guest user") may be logged into the system upon power on and/or initialization of an interface device (e.g., HMI) or upon log out of another user of the interface device. This default user enables a particular set of access rights to be used in the control and monitoring system 24 without requiring a user to login to the HMI. As illustrated in FIG. 5, the guest user role may have a limited number of editable attributes in the security programming screen 130. Because this account is a default account that is logged in automatically upon power on and/or initialization of an interface device and/or upon log out of another user of the interface device, in some embodiments, user names, passwords, personal identification numbers (PINs), etc. may not be needed. Accordingly, as illustrated in FIG. 5, in one embodiment, the only modifiable attribute of the guest user is the guest user role.

As shown in FIG. 5, a drop-down box 132 or other user input may be provided for defining the guest user role 134. As discussed above, pre-defined roles may be provided in the system 24. For example, in the illustrated embodiment, the pre-defined roles include: Administrator 136, Engineer 138, Maintenance 140, None 142, Operator 144, Restricted 146, and Supervisor 148. As may be appreciated, the role of Administrator 136 may be assigned to users who are tasked with overall system management. The role of Engineer 138 may be assigned to users tasked with design and oversight of equipment within the system. The role of Maintenance 140 may be assigned to users tasked with maintaining and/or monitoring equipment within the facility (e.g., a user tasked with monitoring and/or maintaining engine equipment within the system 24). The role of Operator 144 may be assigned to a user tasked with operation of particular equipment in the system 24 and the role of Supervisor may be assigned to users who are managers of other users. The role of None 142 may be assigned to users who do not have a current role. For example, when a user no longer has an active role with regards to the system 24 (e.g., the user 24 is terminated and/or moved on to another project) the user's role may be set as None 142. This may enable the user account to remain active while noting the user does not have a role in the system 24. The role of Restricted 146 may be assigned to any user that should have limited access to the system. This may be particularly useful for the guest user account, because the guest user account does not require an authentication input (e.g., password or personal identification number) to login to the system 24.

The security programming screen 130 may also include customizable security options for the other users of the system 24. For example, each user account may have a modification section 150. In some embodiments, the modification section 150 may be collapsed until an expansion input 152 is selected. In the collapsed view, the modification section 150 may provide the user name 154, the role 156 assigned to the user's account, and/or the full user name 158 associated with the account. Upon expansion, an expanded view 160 may be provided with editable fields 162. For example, a user name field 164, a full name field 166, a description field 168, a role drop-down or input 170, a password field 172 and/or a PIN field 174 may be provided. Additionally, a reset button 176 may be provided. The reset button 176 may empty or reset all fields to default values upon selection. Additionally, the security programming screen 130 may also include an OK button 178 that applies the changes and closes the security programming screen 130, a Cancel button 180 that cancels any changes that have not already been applied, and an Apply button 182 that applies any changes but leaves the security programming screen 130 open.

Having now discussed user accounts being assigned roles, the discussion turns to roles being assigned access rights.

Figure 6:
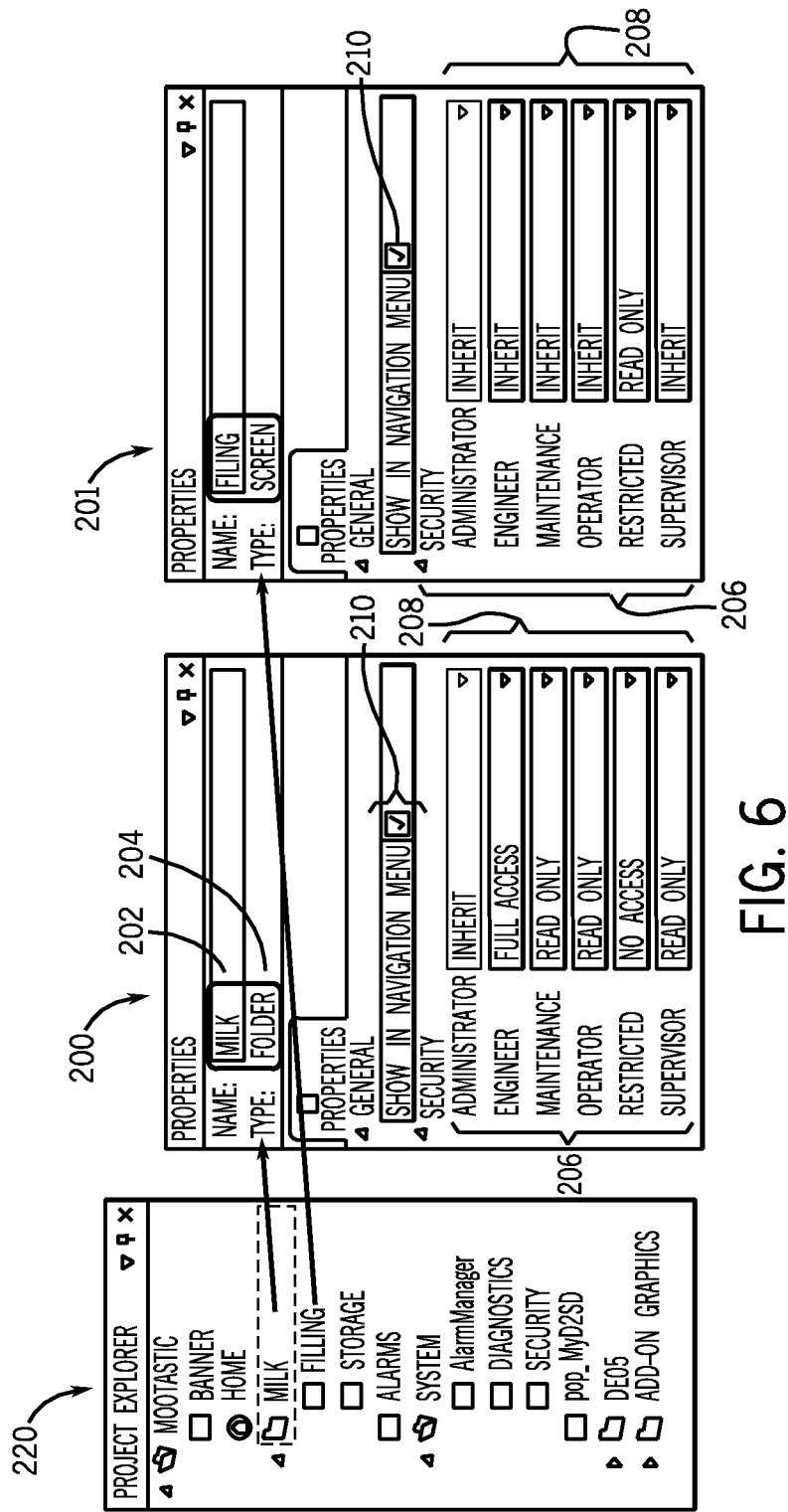
FIG. 6 is a schematic diagram of security properties of components of the control and monitoring system, illustrating security inheritance among folders and screens, in accordance with an embodiment of the present invention.

FIG. 6 is a schematic diagram of a folder security properties screen 200 and a component security properties screen 201 for components of the control and monitoring system 24 of FIG. 2. Access rights may be assigned at a component level within the control and monitoring system 24. For example, these access rights may be assigned at a container or folder level, at an HMI screen level, or at the components within the HMI screen. The folder security properties screen 200 illustrates user roles being assigned access rights for a folder component and the component security properties screen 201 illustrates user roles being assigned access rights for a screen component. As illustrated in FIG. 6, the properties screens 200, 201 may provide identification of a name of the current component, via a name field 202. Further, the properties screens 200, 201 may include the component type (e.g., a folder, HMI screen, or element within an HMI screen), via a type field 204. For example, as indicated by the fields 202 and 204 in folder security properties screen 200, properties for a "Milk" folder are provided. In the component security properties screen 201, as indicated by fields 202 and 204, properties for a "Filling" screen are provided. The folder security properties screen 200 and component security properties screen 201 may include a list of roles 206 and fields 208 useful for specifying access rights for the particular roles in the list of roles 206. In some embodiments, certain access roles may not be editable. For example, in the illustrated embodiment, the role of Administrator includes a forced inherit access right. This may be set based upon security policies of a particular system. For example, in systems that require an administrator to always have full access, the global container may set the role of administrator 136 to have full access, and each component in the system may be required to inherit this full access association from the global container. Additionally, the security properties screen 200 may include a switchable preference 210 to show the component in a navigation menu 220. When selected, the component will show up in navigation menu 220 of the system. When deselected, the component will not show up in the navigation menu 220 of the system. As illustrated, the navigation menu 220 may provide a navigable menu of folders, screens and other components of a project (e.g., the "mootastic" project). Only components indicated by the preference 210 will be displayed in the navigation menu 220.

Figure 7:
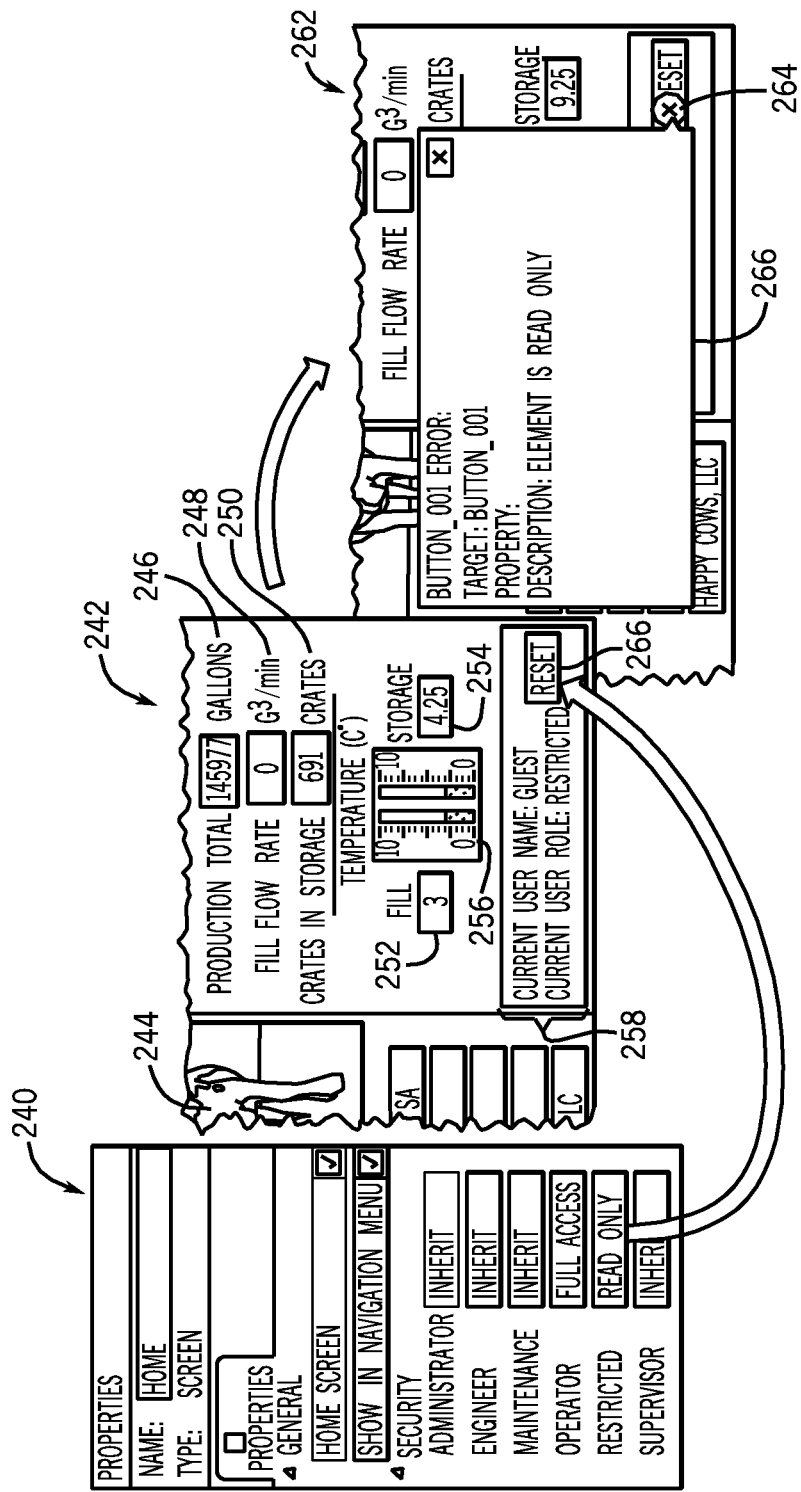
FIG. 7 is a schematic diagram of security properties of a screen of the control and monitoring system, illustrating security inheritance from a screen to objects on the screen, in accordance with an embodiment of the present invention.

Having now discussed the association of access rights to a user role, the discussion turns to security inheritance. FIG. 7 illustrates a schematic diagram of security property of a screen of the control and monitoring system being inherited by objects contained in the screen, in accordance with an embodiment. As indicated by the security properties screen 240, which provides security settings for the "Home" screen, the roles of Administrator 130, Engineer 138, Maintenance 140, and Supervisor 148 each inherits access rights from the containing folder. For example, these roles will take on the access assigned to their corresponding roles at the containing folder level. The role of Operator 144 is assigned a full access role and the role of Restricted 146 is assigned read only access rights. As discussed above, the guest user will oftentimes be assigned the role of Restricted 146 because no login password or PIN is required. Instead the user is logged in automatically upon power on and/or initialization of an interface device (e.g., HMI) and/or log out of another user of the interface device. Accordingly, an administrator of the system may desire to restrict access for the guest user.

Elements within the "Home" screen may, by default, inherit access rights from the screen security properties. For example, HMI screen 242 is an example of an HMI screen provided in the run-time environment. As illustrated, the HMI screen 242 contains many objects. For example, an image 244, a production total field 246, a fill flow rate field 248, and crates in storage field 250 are provided. Further, a fill level indicator 252, a storage indicator 254, and a graphical temperature indicator 256 are provided. Additionally, a current user name and role indicator 258 and a reset button 260 are provided. Each of these objects may inherit access rights from the screen security properties. For example, the reset button 260 may provide inherit access rights for administrators, engineers, maintenance personnel, and supervisors. Further, full access may be provided for operators and read only access may be provided to restricted users.

As indicated by the current user name and role indicator 258, a guest user is currently logged into the interface device. As discussed above, in the current embodiment, an administrator has assigned the guest user a restricted role. As indicated by the security properties screen 240, read only access is provided for the guest user account. Accordingly, because each of the objects within the "Home" screen may inherit these access rights, the reset button 260, for example, also has read only rights for the guest user account. Thus, the reset button 260 is viewable to the guest user, but cannot be acted upon.

HMI screen 262 illustrates and example embodiment of a resultant outcome when a guest user attempts to press the reset button 260 when only having read only access. As illustrated in HMI screen 262, when a user with read only access attempts to write to or otherwise access an object without such rights (e.g., pressing a reset button 260), an error graphic 264 may appear over the object. Further, an error dialog box 266 may be referenced from the error graphic 264, and may indicate that sufficient access rights do not exist for a user to complete the attempted activity. For example, the error graphic 264 may be selected with a cursor to initiate display of the error dialog box 266. In the current error dialog box 266, the dialog box 266 indicates that the reset button is read only.

Figure 8:
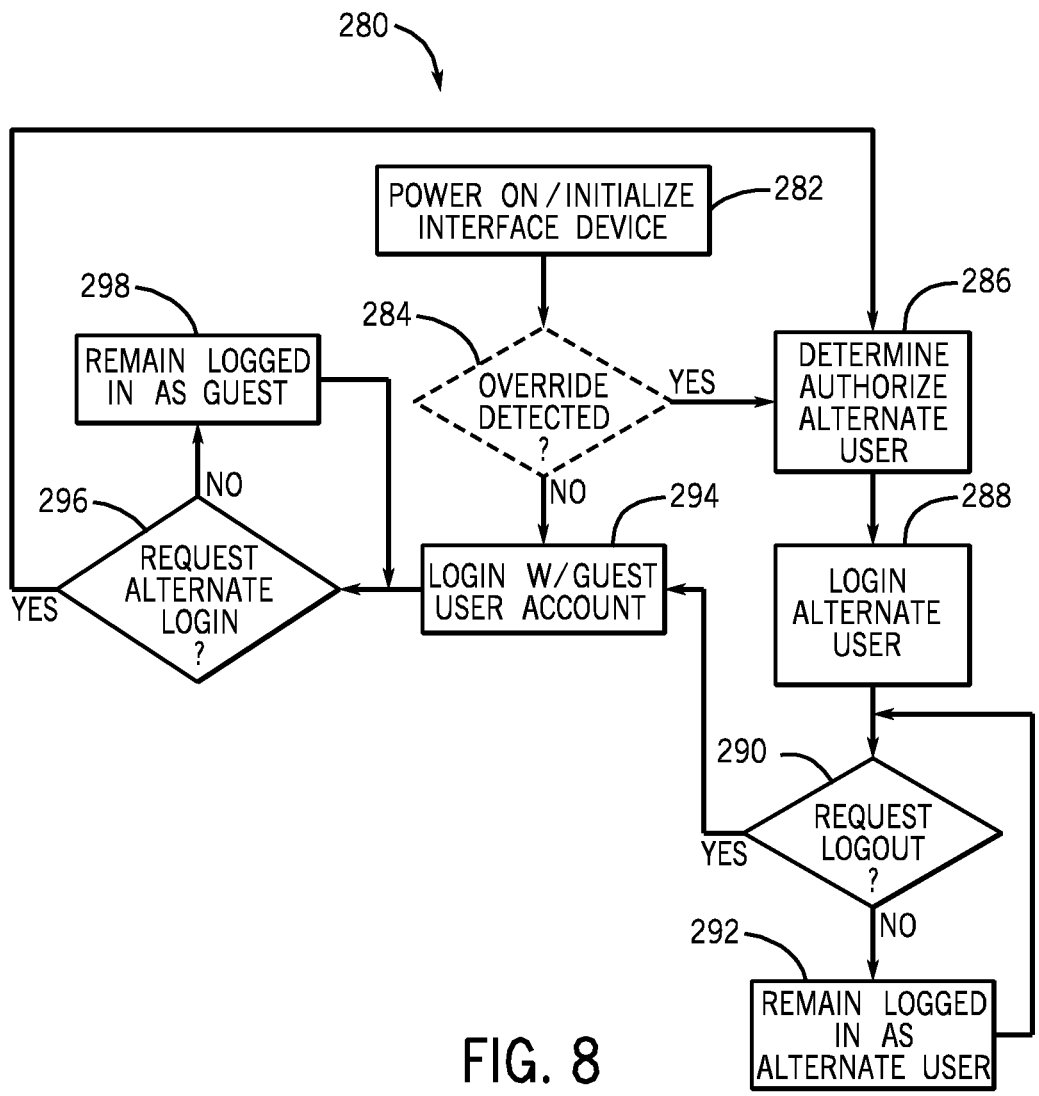
FIG. 8 is a flowchart, depicting a process for implementing flexible security settings in an automation control and monitoring system, in accordance with an embodiment of the present invention.

FIG. 8 is a flowchart, depicting a process 280 for implementing flexible security settings in an automation control and monitoring system, in accordance with an embodiment. As discussed above, an interface device is powered on and/or initialized (block 282). In some embodiments, an override key may enable a user to login before the guest user is logged in. Accordingly, a determination may be made whether an override trigger is detected (decision block 284). If an override trigger is detected, an alternate user login may be determined and/or authorized (block 286). After authorization, the alternate user is logged in (block 288). The system then polls for a requested log out by the alternate user (decision block 290). For example, the log out request might be made via a logout option of a toolbar presented in a graphical user interface of the interface device, might be triggered based upon an object presented in a visualization of the interface device, could be triggered by another component of the automation control and monitoring system (e.g., a controller), might be triggered via a script in an HMI application, etc. If no log out is requested, the alternate user remains logged in until such a request is received (block 292).

When a logout request is received from the alternate user or no override was detected, the guest user is logged in (block 294). The system polls for a request for an alternate login (e.g., a request to login a specific user other than the guest user) (decision block 296). If not such request is received, the guest user remains logged in until such a request is received (block 298). If such a request is received the alternate user login is determined and/or authorized and the user is logged in (blocks 286 and 288). The alternate user log out is processed according to blocks 290-294, discussed above.

Figure 9:
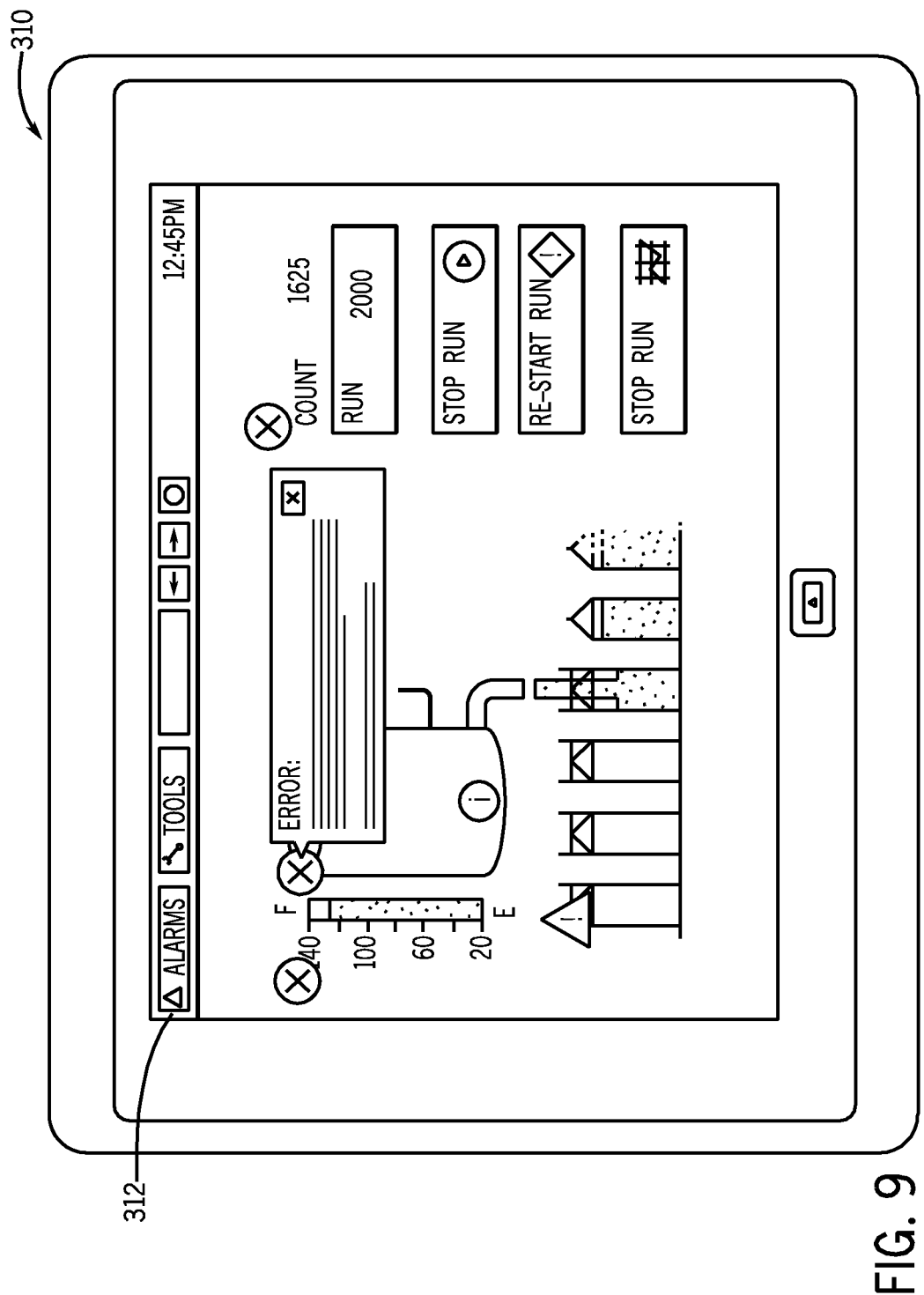
FIG. 9 is a schematic view of a human-machine interface (HMI) with the flexible security features described herein, in accordance with an embodiment of the present invention.

Having now discussed the guest user account, its associated roles and access rights, and a process for logging in and out the guest user and alternate users, the discussion turns to an embodiment of an interface device configured to use and facilitate these flexible security features. FIG. 9 is a schematic view of a human-machine interface (HMI) 310 with the flexible security features described herein, in accordance with an embodiment. As discussed above, the HMI 310 may be useful for monitoring and/or controlling processes within an automation control and monitoring system. The HMI 310 may provide field measurements, etc. of processes within the automation control and monitoring system. To facilitate the flexible security features described herein, the HMI 310 may include a toolbar 312 that provides current access right information. For example, the toolbar may provide an account name associated with an account that is currently logged into the HMI 310, a full name of a user associated with the account, access rights associated with the account for the currently displayed component of the HMI 310, or a combination thereof.

In some embodiments, the interface device or other component of the automation control and monitoring system may track access utilization of the interface device. For example, the interface device may monitor unsuccessful login attempts, successful login attempts, utilization of the guest user account, etc. The access utilization may be stored as a historical log in computer-readable storage. Such information may be useful in determining who has accessed the interface device at a particular time. Further, the information stored in the historical log may help to detect unauthorized access attempts, etc.

Figure 10:
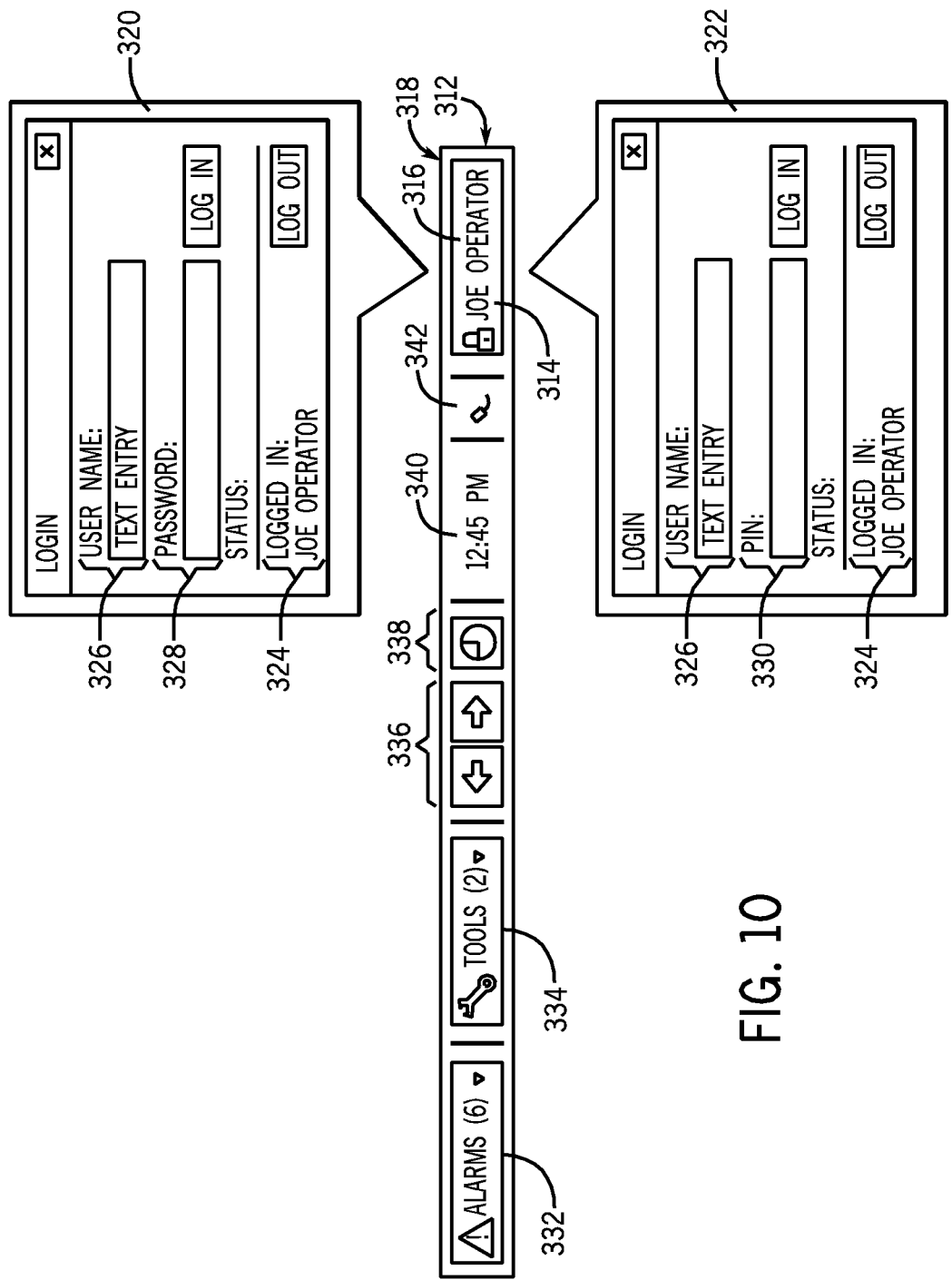
FIG. 10 illustrates a visualization of a toolbar incorporating flexible security elements, in accordance with an embodiment of the present invention.

FIG. 10 illustrates a more detailed schematic view of the toolbar 312 of the HMI 310 for facilitating flexible security elements, in accordance with an embodiment. As illustrated, the toolbar 312 may provide an account name 314 (e.g., "Joe"). Further, the toolbar may provide a role 316 associated with the currently logged in account (e.g., "Operator"). These attributes (or any other security related attributes) may be provided in the form of a toolbar button 318. The toolbar button 318, when pressed, may trigger a login dialog box (e.g., login dialog box 320 or 322). The login dialog boxes 320, 322 are quite similar. Both provide an indicator 324 of the currently logged in user and/or role (e.g., "Joe operator"). Further, both provide a user name field 326 that enables the current user to provide a new user account to login to the system. Depending on the account associated with the username, a password and/or a PIN may be assigned (as discussed with regards to FIG. 5). Accordingly, login box 320 (with a password field 328) may be provided when the account includes a password and login box 322 (with a PIN field 330) may be provided when the account includes a PIN. Additionally, both login boxes 320, 322 provide a log out button 332. When pressed, the current user (e.g., "Joe Operator") will be logged out of the system. Further, as discussed in the process 280 of FIG. 8, the guest user is logged back in to the system.

The toolbar 312 may also include other features accessible to the currently logged in user. For example, an alarm indicator 332 may provide alarm information if the user has available access (e.g., at least data read only access). Further, a tools button 334 may provide access to HMI tools. Navigation buttons 336 may provide access to previous screens accessed by the HMI. In some embodiments, the navigation buttons 336 may be disabled based upon forward-looking and/or backward-looking access rights. For example, forward and/or backward navigation buttons 336 may be disabled when the logged in user does not have read access to the screens these buttons 336 navigate to. A history indicator 338 may provide historical data for the HMI, a time indicator 340 may provide the current time according to the HMI's clock, and a power indicator 342 may provide an indicator of a power source and statistics for the HMI.

By providing a guest user account that automatically logs in to an interface device of an automation monitoring and control system, administrators of these devices may have an increased ability to customize security options, such as allowing access to these devices without requiring a username, password, or PIN. Additionally, by creating a restricted role that may be associated with this guest account, these administrators may still provide a required login solution. For example, the guest user could be associated with the restricted role and the restricted role could be provided no access to the home screen of the project. Accordingly, to access any information within the project, a user would necessarily have to provide login credentials. The combination of a guest user account with a restricted role thus generates a flexible security solution that is relatively easy for the administrator to customize.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An automation control system, comprising:
an interface device configured to enable a user to monitor, control, or monitor and control processes of the automation control system;
wherein, after initialization of the interface device, the interface device is configured to:
whenever an authentication input has not been received, login a guest account associated with a restricted user role having a defined set of access rights specific to users that have not provided an authentication input, wherein the defined set of access rights are selectively changeable via an account associated with administration of the defined set of access rights; and
whenever the authentication input has not been received, provide access to monitor, control, or monitor and control the processes based upon the set of access rights.

2. The automation control system of claim 1, wherein the interface device is configured to:
poll for an override key at each initialization of the interface device;
when the override key is detected, poll for and determine a validity of a provided authentication input;
when the provided authentication input is not valid, login the guest account; and
when the provided authentication input is detected and valid, login a user account associated with the provided authentication input.

3. The automation control system of claim 1, wherein the interface device is configured to login the guest account when an alternate account is logged out of the interface device.

4. The automation control system of claim 3, wherein the interface device comprises a human machine interface (HMI).

5. The automation control system of claim 1, wherein the access rights are specific to a particular component of the interface device, the interface device comprising a human machine interface (HMI), the particular component comprising:
an HMI project associated with the automation control system;
one or more objects of an HMI device screen;
the HMI device screen;
a first folder of the HMI containing interface device screens;
or a second folder of the HMI containing a first screen.

6. The automation control system of claim 1, wherein the access rights comprise inherit access rights for a particular component, wherein the inherit access rights are configured to inherit access rights for the particular component from a higher level component of the interface device.

7. The automation control system of claim 6, wherein the particular component comprises one or more objects of an interface device screen and the higher level component comprises the interface device screen.

8. The automation control system of claim 1, wherein the interface device is configured to log out the guest account when an alternate account is authenticated and logged into the interface device.

9. The automation control system of claim 1, wherein the interface device is configured to provide a toolbar configured to enable the user to login as an alternate account.

10. The automation control system of claim 9, wherein the toolbar, a user-defined log-out command, or a system-defined logout command, or any combination thereof is configured to enable the user to logout the alternate account, thus triggering login of the guest account.

11. The automation control system of claim 1, wherein choices for the access rights comprise: full access, read only access, no access, and inherit access.

12. The automation control system of claim 1, wherein choices for the user role comprise: an administrator role, an engineer role, a maintenance role, an operator role, a restricted role, a supervisor role, a none role, a user-defined role, or any combination thereof.

13. A method, comprising:
after initializing an interface device of an automation control system:
whenever an authentication input has not been received, logging in, via a processor of the interface device, a guest account associated with a restricted user role having a defined set of access rights specific to users that have not provided an authentication input, wherein the defined set of access rights are selectively changeable via an account associated with administration of the defined set of access rights, without requiring login information; and
whenever the authentication input has not been received, providing, via the processor of the interface device, access to monitor, control, or monitor and control the processes based upon the set of access rights.

14. The method of claim 13,
polling for an override key at each initialization of the interface device;
when the override key is detected, polling for and determining a validity of a provided authentication input;
when the provided authentication input is not valid, logging in the guest account; and
when the provided authentication input is detected and valid, logging in a user account associated with the authentication input.

15. The method of claim 13, comprising:
detecting an override trigger before logging in the guest account;
providing an alternate user login screen upon detecting the override trigger;
authenticating a request for login provided from the alternate user login screen;
logging in an alternate account if the request is authenticated; and
only logging in the guest account when the alternate account is not logged in.

16. The method of claim 13, comprising:
detecting a request to login an alternate account;
logging out the guest account and logging in the alternate account when the request is authenticated.

17. A non-transitory, computer-readable medium, comprising computer-readable instructions to:
whenever an authentication input has not been received, login a guest account of an interface device of an automation monitoring and control system, without requiring login information;
wherein the guest account is associated with a restricted user role having a defined set of access rights specific to users that have not provided an authentication input, wherein the defined set of access rights are selectively changeable via an account associated with administration of the defined set of access rights;
whenever the authentication input has not been received, provide access to monitor, control, or monitor and control the processes based upon the set of access rights.

18. The computer-readable medium of claim 17, comprising instructions to:
display a security programming screen comprising a security role input for the guest account, wherein the security programming screen is configured to associate a user role with the guest account.

19. The computer-readable medium of claim 18, wherein the security role input is configured to enable association of the guest account with an administrator role, an engineer role, a maintenance role, an operator role, a restricted role, a supervisor role, a none role, a user-configured role, or any combination thereof.

20. The computer-readable medium of claim 17, comprising computer-readable instructions to:
display a security properties screen associated with components of the interface device;
wherein the security properties screen comprises access rights fields for each role provided in the interface device and the access rights fields are configured to define access rights for each of the roles provided in the interface device.

21. The computer-readable medium of claim 17, wherein the access rights comprise: full access, read only access, no access, and inherit access.

* * * * *